Patented Oct. 24, 1950

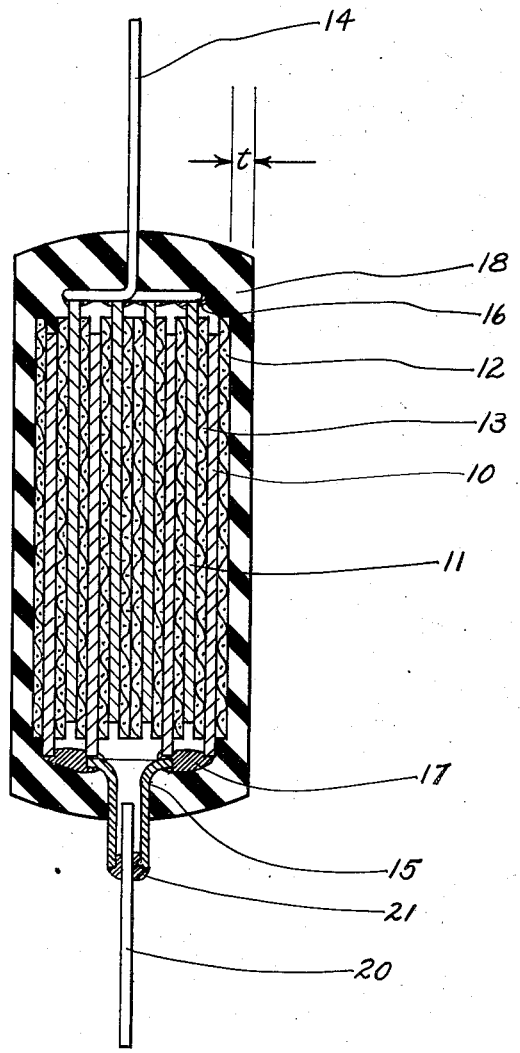
PRESTON ROBINSON
HAROLD J. ST. DENIS
INVENTORS

2,526,688

UNITED STATES PATENT OFFICE 2,526,688

PROCESS OF PRODUCING ELECTRICAL CONDENSERS

Preston Robinson, Williamstown, and Harold J. St. Denis, North Adams, Mass., assignors to Sprague Electric Company, North Adams, Mass., a corporation of Massachusetts Application December 28, 1946, Serial No. 718,962

6 Claims. (Cl. 18—59)

This invention relates to a process of producing improved electrical condensers and insulation therefor and more particularly relates to a process of molding electrical condensers.

It has long been a practice to attempt to seal electrical apparatus, such as a stacked mica condenser, by inserting it in a mold and then molding a thermosetting resin about it. Such molded articles have been considered resistant to water, oil and common solvents except where leads or terminals penetrate the molding, and these weak spots generally are reinforced by dipping the molded article in a wax or resin varnish.

In molding oil-impregnated condensers with thermo-setting resins, such as "Bakelite," it has been found that the molding pressures are often sufficient to damage the condenser insert. For this reason, molded condensers employ 30% to 50% greater insulation thickness than is required for unmolded condensers of the same material. It has been virtually impossible to mold "Bakelite" about a cylindrical oil-impregnated condenser without collapsing or distorting the condenser, causing a dead short or a low voltage breakdown in the product. In addition, the oil squeezes out between the upper and lower molding preforms, leaving a weak joining line.

It is an object of the present invention to overcome the foregoing and related disadvantages. It is a further object to produce electrical condensers by a novel, simple process. A still further object is to produce a hermetically sealed, durable electrical condenser by inexpensive and simple means. A still further object is to produce molded insulation members possessing properties heretofore practically unattainable. A still further object is to utilize molding compounds and processes heretofore of no practical value because of the physical properties of the final product. Additional objects will become apparent from a consideration of the following description and claims.

These objects are attained in accordance with the present invention which comprises molding a resin about a moist condenser, having a porous dielectric spacer, drying the molded unit and impregnating the condenser with a dielectric material. In a more restricted sense, this invention is concerned with a process for producing molded electrical condensers which comprises molding a thermosetting resin about a moist, rolled paper condenser, vacuum drying the molded unit and impregnating said unit with a dielectric material. In a still more restricted sense, the invention is concerned with a process for producing molding electrical condensers which comprises molding a thermosetting resin about an undried, rolled paper condenser, one terminal of which is provided with an eyelet, vacuum drying the molded unit, impregnating said unit with a dielectric material which is liquid at the temperature of impregnation and sealing the eyelet with solder. The invention is also concerned with a process for producing molded electrical condensers which comprises molding a thermosetting resin, such as a filled phenolformaldehyde resin, about a moist cylindrical rolled paper condenser, drying the molded unit at greatly reduced pressures and impregnating said unit with a dielectric oil having a viscosity not greater than about 200 centipoises at the impregnation temperature. The invention is also concerned with the processes described above for producing improved molded members generally, such as terminal insulators, electrical resistors and the like. The invention is broadly concerned with electrical condensers and other devices produced in accordance with the processes herein defined.

We have found and have made practical use of the fact that paper with a minimum moisture content has plastic properties unlike dried paper insulation or vacuum dried and wax or oil impregnated insulation. In this respect, moist paper is similar to a resin impregnated paper which is not thixotropic under molding conditions. Treated paper of this type is discussed in detail in copending application S. N. 689,634 filed on August 10, 1946, by Robinson et al.

According to the broader embodiments of the invention, we have found that a convolutely wound condenser may be provided with a molded resin casing without appreciable deformation of the wound condenser, if the dielectric spacer of the condenser is "wet" during the molding operation. The expression "wet" or "moist" refers to a cellulosic dielectric spacer material with a minimum moisture content of about 5%, instead of the dried condition of the spacer which is produced by heating at elevated temperatures with or without vacuum. In the case of calendered kraft paper we prefer a moisture content of about 5% to about 10%, whereas in the case of regenerated cellulose, we prefer a moisture content of about 7% to about 17%. The exact figure depends somewhat upon the nature of the fibres and/or the physical form of the spacer. In this "moist" condition, the spacer material is resilient and will not undergo deformation under the molding conditions, in contrast to a dried spacer which almost invariably undergoes deformation under the molding conditions. Oil or wax impregnated paper condenser sections in particular deform and distort badly under the molding conditions. By using the "wet" condenser, it is possible to avoid the necessity of adding extra thicknesses of spacer material between the electrode foils to prevent short circuits or low breakdown voltage values in the molded units.

In order to effect the subsequent rapid impregnation of the condenser with dielectric material, one of the terminals may be provided with an eyelet through which the impregnant may flow and through which the moisture may be removed during the post-molding drying operation. Following impregnation, the eyelet may be sealed by solder.

Alternately, the condenser section may be dried and impregnated through the casing per se. This is accomplished by use of special types of molding material under specific molding conditions. According to our embodiment, we mold a resin containing a fibrous or porous filler about the "wet" condenser section, and subsequently remove moisture from the latter through the fibres and pores of the resin. Following this we impregnate the section, as well as the interstices of the resin with a dielectric material. For optimum results, we employ a fibre type filling material, the lengths of the individual fibres being at least as great as the thickness of the molded resin at its thinnest section.

The types of thermosetting and related resins which may be employed in accordance with the invention are extremely varied. Preferably, the resins are of the phenol-formaldehyde, melamine-formaldehyde and urea-formaldehyde series. However, other resins having similar physical and electrical properties may be employed. For instance, it is possible to utilize the processes disclosed herein on certain of the so-called thermoplastic molding resins, such as the natural and synthetic rubbers, the polyvinyl-aromatic resins, the polyacrylates, the "silicones," etc., when proper fillers and advisably dielectric impregnants are employed.

The filling material for the molding material is preferably an "absorbent" type, although crystalline mineral fillers may be employed. Representative fillers include those of a fibrous nature such as cotton linters, rag stock, asbestos, etc., those of the amorphous type such as the alkaline earths, fuller's earth, etc., those of the cellulose family generally, such as alpha-cellulose, wood flour, etc. and, in some cases, inorganic materials such as ground mica, rutile and the like. We have obtained optimum results utilizing the fibrous fillers mentioned above. The percent by weight of filler, based upon the weight of resin, is ordinarily within the range of 40 to 80. The filler and resin are generally incorporated with one another by customary methods by the manufacturer of the molding powder.

The molding temperatures, times and pressures employed in the process are generally similar to those conventionally employed for the particular resin selected. However, when it is desired to produce a porous casing we have found it possible to obtain excellent results in the final product by reducing the curing time to or near the minimum time necessary to obtain a readily ejected and coherent molded unit. This is quite in contrast with the usual practice, where the longer curing cycles were preferred for best results, even though the economics of production were unfavorably affected by so doing. As a general rule, both to obtain good results and to reduce expense, we prefer to employ short curing cycles.

If no eyelet is provided the design of the mold is an important, although not critical, feature of the invention. We prefer to mold inserts in a mold designed to give a relatively thin sectioned molding, preferably less than .08" and for best results, less than .06". The thin sectioning of the molding need not be present throughout the unit, but preferably over at least 25% of the surface area of the insert proper, if the insert is a rolled paper condenser, either cylindrical or flat in form. Thus it is possible to use thicker sections in the portions of the molding which require heavier or stronger insulation for electrical or structural reasons. As mentioned previously, we prefer to employ a filler with a fibre length at least equal to the thickness of the thinnest section of the molded casing.

According to another of the preferred embodiments of the invention, we dry our molded units under reduced pressures at elevated temperatures to remove moisture and other readily vaporizable materials from both the insert and the molded resin. We prefer to conduct this drying under a pressure less than 500 microns of mercury and at temperatures between about 100° C. and about 150° C. The time required for drying will vary with the porosity of the molded resin, the condition of the insert, and the size and structure of the molded unit as a whole. As a general, but not invariable, rule, the drying should be conducted for at least 16 hours.

The impregnation process is advisably conducted in the following manner: The molded units, either in the drying chamber or another low pressure chamber, are subjected to a pressure of 1,000 microns of mercury (1 mm.) or less and the dielectric impregnant is introduced into the chamber until it completely covers the molded units. The vacuum may then be broken, preferably with nitrogen, and super-atmospheric pressures produced to hasten impregnation through the eyelet or otherwise. When impregnation is complete, the units may be removed from the chamber and drained to remove excess oil or wax. The temperature and the time of impregnation depend upon the nature of the impregnant as well as the size and section thickness of the molded units. As a general rule the temperature is within the range of about 85° C. to about 150° C., and the time is within the range of about 30 minutes to about 24 hours.

The dielectric impregnant employed may be any of several types conventionally used in electrical condensers and related equipment, as well as others not previously of practical use. The impregnant should be a liquid at the temperature of impregnation and should possess a viscosity not greater than about 200 centipoises at this temperature and preferably not greater than 100 centipoises. While the impregnation may be conducted at any temperature desired, it is generally between 80° C. and 150° C. Various dielectric oils may be used, for example mineral oil, chlorinated diphenyls, vegetable oils such as castor oil, "silicone" oils and various synthetic dielectric oils. These oils are generally impregnated into the molded unit, at temperatures between about 110° C. and about 135° C. It should be noted that dielectric materials which are solid at normal temperatures may be employed, so long as they are liquid at the impregnating temperature. Among these are the various hydrocarbon waxes, generally microcrystalline in structure, the chlorinated naphthalenes, hydrogenated castor oil, and other synthetic waxes. The impregnant should advisably be resistant to moisture.

Another class of impregnants which may be employed in accordance with the invention are the polymerizable vinyl compounds which may be impregnated as monomeric liquids and subsequently polymerized in situ by use of elevated temperatures and/or catalysts. Among these compounds which may be impregnated as monomeric liquids and subsequently polymerized are styrene and substituted styrenes, such as 2, 5 dichlorostyrene, p-chlorostyrene, etc.; N-vinyl pyrroles such as N-vinyl carbazole, etc. The allyl ester type monomers are also useful per se or as copolymers with vinyl compounds. In the case of the N-vinyl carbazole, impregnation may be conducted at 85° C. Following impregnation, the units may be held at 120° C. for 24 hours to produce a solid impregnated condenser with high voltage breakdown and long life.

After the impregnation of the condenser section and the interstices of the casing, the terminal eyelet, if any, is solder sealed, sealing the dielectric within the casing and thus completing the process.

It has been found that molded condensers produced in accordance with the invention are extremely resistant to moisture and to thermal shocks. They may be exposed to high temperature and high humidity for long periods of time without failure. Heretofore, this stability was associated only with metal encased units, particularly those having glass terminal insulators sealed to the container.

Reference is made to the appended drawing which shows a cross-section of an electrical condenser produced in accordance with the invention. 10 and 11 represent electrode foils of the condenser unit convolutely wound and separated by dielectric spacing materials 12 and 13. Dielectric spacers 12 and 13 consist of a porous dielectric spacer, such as paper, the pores of which are substantially completely impregnated with a liquid or solid dielectric material, such as mineral oil, chlorinated naphthalene, etc. 14 represents a terminal wire, preferably tinned copper, which is soldered to the extended edges of electrode foil 10 by means of solder 16. 15 represents a terminal eyelet soldered by means of solder 17 to the extended edges of foil 11, some space in the center being left unsoldered to permit impregnation. Terminal wire 20 is solder-sealed to eyelet 15 after impregnation by means of solder 21. 18 represents the molded resin casing.

If the special type of molding resin and molding procedure heretofore mentioned as one of the preferred embodiments of the invention is employed, it is unnecessary to use eyelet 15, and the latter may be replaced with another terminal wire, similar to 14. 18 represents a molded resin casing which encloses the condenser unit per se.

Dimension $t$ represents the thickness of the section surrounding the cylindrical surface of the condenser and generally should not be greater than .08″ for optimum results in the finished product, when an eyelet is not employed.

While the invention is particularly directed to electrical condensers, it is to be understood that many features of the invention are equally applicable to the manufacture of improved insulating materials per se, such as molded "Bakelite" terminals, etc. If an absorbent filler is used, the molded insulation material after it is dried and impregnated is usually moisture-resistant. Rigid condensers, such as stacked mica condensers, resin impregnated condensers, etc., may be molded and treated in accordance with this embodiment of the invention. We have found that not only is the moisture-resistance of the molding vastly improved, but the voltage breakdown and tracking voltage of the molded resin are considerably increased over the usual molded material, even if the latter has been waxed or varnished.

As many apparently widely different embodiments of this invention may be made without departing from the spirit and scope hereof, it is to be understood that the invention is not limited to the specific embodiments hereof except as defined in the appended claims.

We claim:

1. A process for producing a rigidly encased, convolutely wound electrical condenser, which comprises heat and pressure molding a thermosetting resin about an unimpregnated, rolled condenser section, whose dielectric spacer material contains between about 5% and about 17% by weight of moisture, drying the molded unit to remove substantially all of the moisture therefrom, and then impregnating the dried unit with a liquid dielectric material.

2. A process for producing a rigidly encased, tubular electrical condenser, which comprises heat and pressure molding a thermosetting resin about an unimpregnated cylindrical rolled condenser section provided with an eyelet at one terminal, whose dielectric spacer material contains between about 5% and about 17% by weight of moisture, vacuum drying the molded unit to remove substantially all of the moisture therefrom, impregnating the dried unit with a dielectric oil, and sealing said eyelet.

3. A process for producing a rigidly encased, tubular electrical condenser, which comprises heat and pressure molding a thermosetting formaldehyde condensation resin containing an absorbent filler about an unimpregnated cylindrical rolled paper condenser section whose dielectric paper contains between about 5% and about 17% by weight of moisture, vacuum drying the molded unit to remove substantially all of the moisture therefrom, and then impregnating the dried unit with a dielectric oil having a viscosity not greater than about 200 centipoises at the impregnation temperature.

4. A process for producing a rigidly encased, tubular electrical condenser, which comprises heat and pressure molding a thermosetting phenol formaldehyde resin containing an absorbent fibrous filler about an unimpregnated cylindrical rolled paper condenser section provided with an eyelet at one terminal, whose dielectric paper contains between about 5% and about 17% by weight of moisture, removing the moisture from said molded unit through the opening of the eyelet at elevated temperature under vacuum, impregnating the dried unit through said opening with a liquid dielectric material at temperatures between about 85° C. and about 150° C., and then sealing said opening with solder.

5. A process for producing a rigidly encased electrical condenser, which comprises providing an unimpregnated rolled paper condenser section having electrode members of opposite polarity separated by a paper dielectric spacing material that contains between about 5% and about 17% by weight of moisture, soldering a metallic eyelet to one of said electrode elements at one end of said condenser section, heat and pressure molding a thermosetting resin casing about said condenser section and said eyelet leaving the eyelet as an opening through the casing to the condenser section, removing the moisture from the encased condenser section through the eyelet at elevated temperature under vacuum, impregnating the dried unit through said eyelet with a liquid dielectric material at temperatures between about 85° C. and about 150° C., and then sealing said opening with solder.

6. A process for producing a rigidly encased electrical condenser, which comprises providing an unimpregnated rolled paper condenser section having electrode members of opposite polarity separated by a paper dielectric spacing material that contains between about 5% and about 17% by weight of moisture, and having a metallic eyelet soldered to one of said electrode elements at one end of said condenser section, heat and pressure molding a thermosetting resin casing about said condenser section and said eyelet leaving the eyelet as an opening through the casing to the condenser section, removing the moisture from the encased condenser section through the eyelet at elevated temperature under vacuum, impregnating the dried unit through said eyelet with a molten chlorinated napthalene dielectric and then sealing said opening with solder.

PRESTON ROBINSON.
HAROLD J. ST. DENIS.

REFERENCES CITED

The following references are of record in the file of this patent:

UNITED STATES PATENTS

| Number    | Name     | Date          |
|-----------|----------|---------------|
| 1,497,415 | Thomas   | June 10, 1924 |
| 2,058,846 | Waterman | Oct. 27, 1936 |
| 2,181,695 | Given    | Nov. 28, 1939 |
| 2,414,525 | Hill     | Jan. 21, 1947 |

FOREIGN PATENTS

| Number  | Country       | Date          |
|---------|---------------|---------------|
| 389,236 | Great Britain | Mar. 16, 1933 |